6901X
S. Simmons.
Throstle Frame.
No. 9
Patented Jan. 16, 1832.
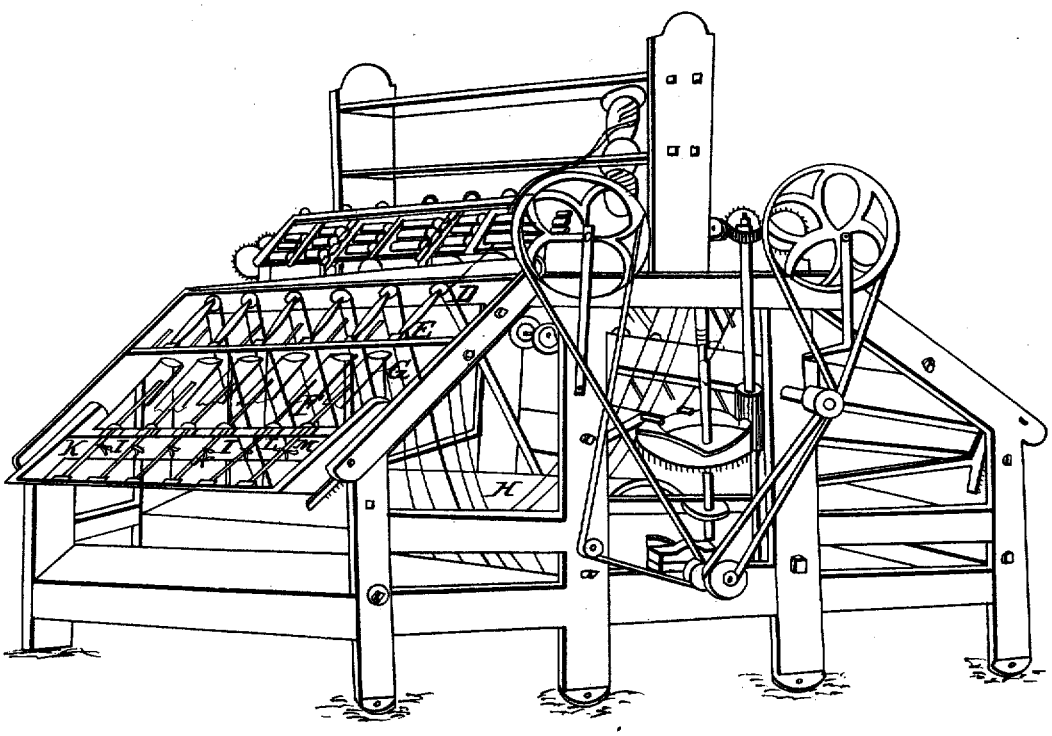
N. PETERS, PHOTO-LITHOGRAPHER, WASHINGTON, D. C.

6901x Jan 16. 1832

Seth Simmons of Providence Rhode Isl.

Letters Patent

The Schedule referred to in these Letters Patent and making part of the same
containing a description in the words of the said Seth Simmons himself of
his improvement in the Throstle frame for spinning Cotton To all persons to whom these presents shall come. Seth Simmons
of Providence in the County of Providence and State of Rhode Island.
Gentleman sends Greeting. Be it known that the said Seth Simmons
has invented and constructed made and applied to use a new and useful
Improvement in the mode of spinning Cotton Specified in the words
following to wit. This improvement in the machine commonly called
the Throstle frame consists in taking the thread from the rollers in the
centre of the balance flier. thence running through the gudgeon and pulley
which is in the said balance flier, through a hole one inch long, and
thence passing over the outside of the hole of the balance flyer until it comes
to another hole one inch from the lower end of the same balance flyer. through
which it passes to the end of the flyer, and into the bobbin which receives
it in manner following (Viz). By a band taken from the drum in the cen
tre of the frame. thence running to a shaft under a joist that holds the
lower end of the balance flyer. There is an improvement in the position of the
spindle forming instead of a right angle with the machine an angle of for
ty five degrees only. These spindles may be termed independent spindles,
so constructed to move round fast or slow as occasion may require, in fil
ling the bobbin in the manner following viz. take a bar of wood about one
inch wide and of sufficient length and place a little back of the spindles
in this bar of wood small studds of iron about one inch in height are set
in and small wooden springs about five inches in length against each spindle
A thumb screw enters into each studd and bears against the wooden springs afore
said which springs are intended to bear directly against the spindles near the
middle under the shoulder. The bearing of the wooden spring instead of being
against the Spindle as aforesaid may be against the lower part of the bobbin
the last mentioned method is however inferior to the first. The spinni
[illegible]

498 6901X Jan. 16, 1832

I claim as original with me in this invention is. the method of bracing against the Spindles or bobbin with springs. a method which is perfect in its operation. and without the application of which the machine as above described cannot be operated to advantage.

In testimony that the above is a true specification of my said improvement as above described; I have hereunto set my hand and seal this sixth day of February in the Year of our Lord Eighteen Hundred and twenty six Witnesses
John Brown }
Edwin S Brown }

Seth Simmons

1807

[Granted January 16. 1832] See Dr. J. 500

(No. 1913). Seth Simmons

United States of America } to wit
State of Maryland

I Samuel Fernandis Notary Public by Letters Patent under the Great Seal of the State of Maryland Commissioned and duly qualified residing in the City of Baltimore, in the State aforesaid do hereby certify attest and make known, that the foregoing Letters Patent, and Schedule, signed Seth Simmons" [illegible] Instrument of writing are true and faithful copies of the originals of which they purport to be copies, the same having been Carefully examined and compared with said Originals by me Notary and found to agree therewith word for word and figure for figure.

In testimony Whereof I have hereunto set my hand and affixed my seal Notarial this fifteenth day of February in the year of our Lord Eighteen hundred and thirty two Saml Fernandis Noty Pub.

Exd Wylie